United States Patent
Koo et al.

(10) Patent No.: US 8,467,736 B2
(45) Date of Patent: Jun. 18, 2013

(54) METHOD AND APPARATUS FOR INTER-CELL SYNCHRONIZATION IN A MULTI-CELL ENVIRONMENT

(75) Inventors: Ja-Ho Koo, Gyeonggi-Do (KR); Yeong-Hyeon Kwon, Gyeonggi-Do (KR); Jae-Hoon Chung, Gyeonggi-Do (KR); Bin-Chul Ihm, Gyeonggi-Do (KR); Hyun-Soo Ko, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 13/143,773

(22) PCT Filed: Dec. 28, 2009

(86) PCT No.: PCT/KR2009/007841
§ 371 (c)(1),
(2), (4) Date: Jul. 8, 2011

(87) PCT Pub. No.: WO2010/085048
PCT Pub. Date: Jul. 29, 2010

(65) Prior Publication Data
US 2011/0269407 A1    Nov. 3, 2011

Related U.S. Application Data

(60) Provisional application No. 61/145,969, filed on Jan. 21, 2009, provisional application No. 61/146,312, filed on Jan. 22, 2009.

(30) Foreign Application Priority Data

Aug. 26, 2009  (KR) .................. 10-2009-0079294

(51) Int. Cl.
*H04B 17/00* (2006.01)
(52) U.S. Cl.
USPC ......... 455/67.11; 370/281; 370/328; 370/350
(58) Field of Classification Search
USPC ................................................ 455/67.11
See application file for complete search history.

(56) References Cited

U.S. PATENT DOCUMENTS

| | | | |
|---|---|---|---|
| 5,689,502 A * | 11/1997 | Scott | 370/281 |
| 6,665,521 B1 | 12/2003 | Gorday et al. | |
| 2004/0225740 A1 | 11/2004 | Klemba et al. | |
| 2006/0239222 A1 | 10/2006 | Kim et al. | |
| 2009/0046629 A1 * | 2/2009 | Jiang et al. | 370/328 |
| 2010/0172340 A1 * | 7/2010 | Muharemovic et al. | 370/350 |

FOREIGN PATENT DOCUMENTS

KR  10-2006-0111238  10/2006

* cited by examiner

*Primary Examiner* — Ajibola Akinyemi
(74) *Attorney, Agent, or Firm* — Morgan, Lewis & Bockius LLP

(57) ABSTRACT

The present invention relates to a method for synchronizing multiple cells, which perform cooperative multi-input multi-output operations, as well as to a method for inter-cell synchronization in a multi-cell environment, comprising the steps of: measuring a propagation delay of a cooperative base station; transmitting the measured propagation delay to a serving base station; and receiving data for cooperative multi-input multi-output operations in which a transmission location is adjusted, on the basis of the propagation delay of the cooperative base station, when the serving base station transmits the propagation delay to the cooperative base station.

14 Claims, 6 Drawing Sheets

METHOD AND APPARATUS FOR INTER-CELL SYNCHRONIZATION IN A MULTI-CELL ENVIRONMENT

The present application is a national stage of PCT International Application No. PCT/KR2009/007841, filed Dec. 28, 2009, and claims the benefit of U.S. Provisional Application Nos. 61/145,969, filed Jan. 21, 2009, and 61/146,312, filed Jan. 22, 2009. The present national stage application also claims the benefit of Korean Patent Application No. 10-2009-0079294, filed Aug. 26, 2009.

TECHNICAL FIELD

The present invention relates to wireless communication, and more particularly, to an inter-cell synchronization method and apparatus in a multi-cell environment.

BACKGROUND ART

In recent years, multiple input multiple output (MIMO) technology is primarily considered as one of technologies used in a next-generation mobile communication and wireless transmission system. The multiple input multiple output (MIMO) technology is a method for enhancing a spectral efficiency using multiple antennas to enhance a low spectral efficiency that has been a problem of the single input single output (SISO) method in the prior art.

The multiple input multiple output (MIMO) technology can be divided into a spatial multiplexing technique and a spatial diversity technique according to whether or not to transmit the same data.

The spatial multiplexing technique is a method for transmitting different data through several transmitting and receiving antennas at the same time. In other words, different data is transmitted through each transmitting antenna at the transmitter side, and suitable interference removal and signal processing is carried out for the received signals at the receiver side to obtain the transmitted data, thereby enhancing data transmission rate in proportion to the number of transmitting antennas.

The spatial diversity technique is a method for transmitting the same data through several transmitting antennas to obtain transmission diversity. In other words, the spatial diversity technique is a kind of space-time channel coding.

In such a spatial diversity technique, the same data is transmitted from several transmitting antennas, thereby greatly enhancing a transmission diversity gain. However, the spatial diversity technique is not a method for enhancing a transmission rate of data, but for enhancing the reliability of data transmission by enhancing a diversity gain.

Furthermore, the multiple input multiple output (MIMO) technology can be divided into an open loop method and a closed loop method according to whether information on channels is fed back from the receiver side to the transmitter side. Of them, the multiple input multiple output (MIMO) technology with a closed loop method may enhance a transmission rate of data using channel information fed back from the receiver side. For example, in a wireless communication system using the multiple input multiple output (MIMO) with a closed loop method, the base station at the transmitter side receives a feedback on information of transmission channels from the terminal at the receiver side, and transmits data using this.

On the other hand, a coordinated multi-point (CoMP) transmission method has been developed to reduce inter-cell interference in a multi-cell environment. Using the coordinated multi-point (CoMP) transmission method, the terminal may receive data in common from multi-cell base stations.

Furthermore, each base station may support one or more terminals at the same time using the same frequency resource to enhance the performance of the system. It may be possible to enhance the communication performance of a terminal located at an edge of the cell using the CoMP method in a multi-cell environment.

The coordinated multi-point (CoMP) transmission method may include a joint processing scheme in the form of a collaborative multiple input multiple output (MIMO) through data sharing and a coordinated scheduling/beamforming scheme for reducing inter-cell interference such as worst companion and best companion.

Of them, in order to smoothly perform the collaborative multiple input multiple output (MIMO) method such as joint processing, synchronization between multiple cells performing this should be properly carried out. However, a method for precisely synchronizing multiple cell base stations performing a collaborative multiple input multiple output (MIMO) operation such as joint processing has not be established so far.

DISCLOSURE OF THE INVENTION

The present invention is contrived to solve the foregoing problems, and an object of the present invention is to provide a method and apparatus for precisely synchronizing multiple cell base stations performing a collaborative MIMO operation with one another in a multi-cell environment.

Another object of the present invention is to provide a method and apparatus for precisely synchronizing multiple cell base stations performing a collaborative MIMO operation with one another in a multi-cell environment, thereby further enhancing the communication performance of a terminal located at an edge of the cell.

In order to accomplish the foregoing objective, according to the present invention, there is provided an inter-cell synchronization method in a multi-cell environment for synchronizing multiple cells performing a collaborative multiple input multiple output (MIMO) operation, and the method may include measuring a propagation delay for a cooperative base station; transferring the measured propagation delay to a serving base station; and receiving data for collaborative multiple input multiple output (MIMO) in which a transmission location is adjusted based on the propagation delay from the cooperative base station when the serving base station transfers the propagation delay to the cooperative base station.

Preferably, the adjustment of a transmission location of the data for collaborative multiple input multiple output by the collaborative base stations may be carried out by controlling a guard zone on a time zone configured in a wireless resource used in the collaborative multiple input multiple output. More preferably, a guard band on a frequency zone may be configured in the wireless resource used in the collaborative multiple input multiple output.

At this time, the measurement of a propagation delay may be carried out using at least any one of a reference signal (RS) or synchronization channel (SCH) of each base station.

Furthermore, the measured propagation delay may be displayed with a difference value on the basis of a propagation delay of the serving base station. Furthermore, the measured propagation delay may be displayed with a relative value of the cyclic prefix (CP) occupied by the serving base station. On the other hand, the measured propagation delay may be transferred to the serving base station only when the propagation delay is longer than a predetermined length.

On the other hand, the measured propagation delay may be transferred to the serving base station through a Physical Uplink Control Channel (PUCCH) or Physical Uplink Shared Channel (PUSCH).

On the other hand, according to the present invention, there is provided an inter-cell synchronization method in a multi-cell environment for synchronizing multiple cells performing a collaborative multiple input multiple output (MIMO) operation, and the method may include allowing a terminal synchronized with a serving base station to measure a propagation delay for a cooperative base station; allowing the terminal to transfer the measured propagation delay to the relevant cooperative base station; and allowing the cooperative base station to adjust a transmission location of data for collaborative multiple input multiple output (MIMO) based on the propagation delay.

In order to accomplish the foregoing objective, according to the present invention, there is provided an apparatus for synchronizing multiple cells performing a collaborative multiple input multiple output (MIMO) operation, the apparatus may include a propagation delay measurement unit configured to measure a propagation delay for a cooperative base station; a transmitter configured to transfer the measured propagation delay to a serving base station; and a receiver configured to receive data for collaborative multiple input multiple output (MIMO) in which a transmission location is adjusted based on the propagation delay from the cooperative base station.

According to an inter-cell synchronization method in a multi-cell environment in accordance with the present invention, multiple cell base stations performing a collaborative multiple input multiple output (MIMO) operation may be precisely synchronized with one another under a multi-cell environment.

In addition, according to an inter-cell synchronization method in a multi-cell environment in accordance with the present invention, multiple cell base stations performing a collaborative multiple input multiple output (MIMO) operation may be precisely synchronized with one another under a multi-cell environment, thereby further enhancing the communication performance of a terminal located at an edge of the cell.

MODES FOR CARRYING OUT THE PREFERRED EMBODIMENTS

Figure 1:
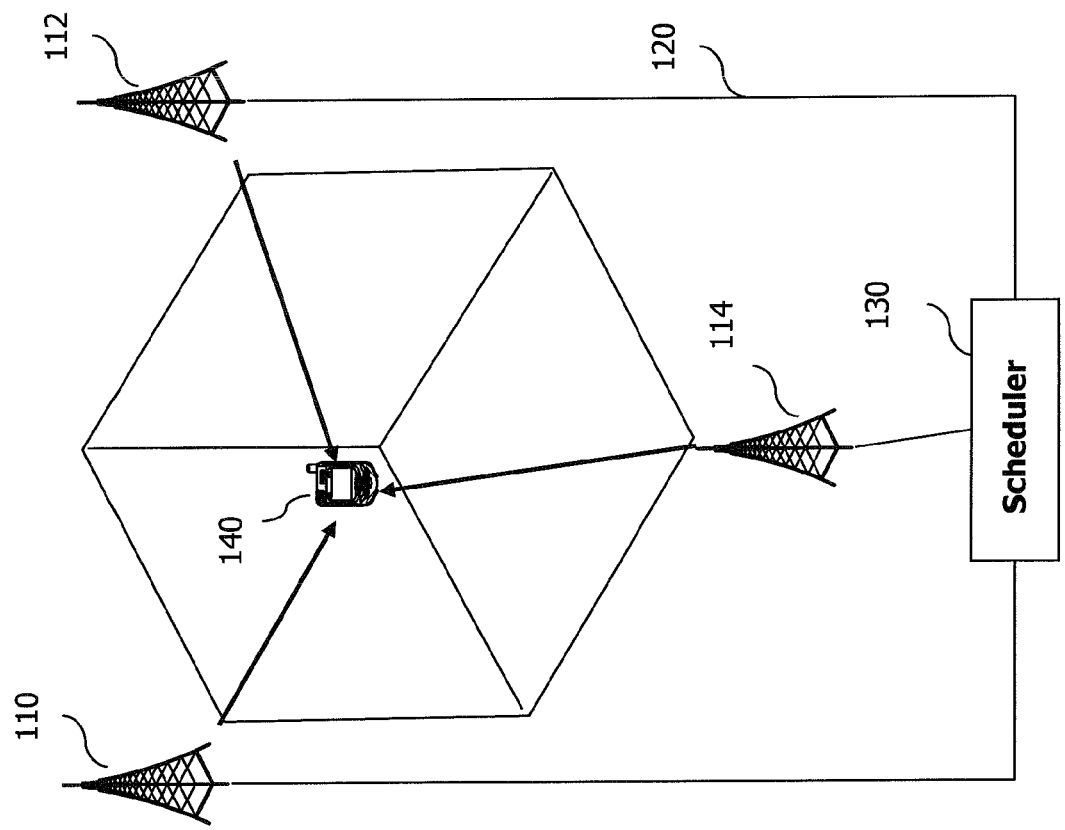
FIG. 1 is a schematic configuration diagram schematically illustrating the configuration of a multi-cell communication system performing a collaborative multiple input multiple output operation.

Hereinafter, preferred embodiments of the present invention will be described in detail with reference to the accompanying drawings. The same reference numerals are designated to the same constituent elements throughout the entire drawings.

Embodiments of the present disclosure are described mainly in relation to the transmission and reception of data between a base station and a mobile station. Here, the base station functions as a terminal node of a network, which directly performs communication with the terminal. Part of a specific operation or processing described to be performed by a base station may be carried out at an upper node of the base station according to circumstances.

Furthermore, in this embodiment, the term "base station" may be replaced by a term such as fixed station, Node B, eNode B (eNB), access point, or the like. Furthermore, the term "terminal" may be replaced by a term such as user equipment (UE), mobile station (MS), mobile subscriber station (MSS), or the like.

A wireless communication system performing a collaborative multiple input multiple output (MIMO) operation such as joint processing may include a base station of the serving cell to which the terminal belongs (hereinafter, referred to as "serving base station"), a base station of the adjacent cell performing collaborative multiple input multiple output (MIMO) (hereinafter, referred to as "cooperative base station"), and a scheduler connected to the serving base station and cooperative base station through a backbone network. FIG. 1 is a view illustrating the configuration of a collaborative multiple input multiple output (MIMO) communication system that performs collaborative multiple input multiple output (MIMO).

FIG. 1 is a schematic configuration diagram schematically illustrating the configuration of a multi-cell communication system performing a collaborative multiple input multiple output operation. As illustrated in FIG. 1, a serving base station 110 and cooperative base stations 112, 114 are connected to a scheduler 130 through a backbone network 120.

Here, the scheduler 130 may be operated by receiving a feedback of information on a channel state between a terminal 140 and base stations 110, 112, 114. For example, the scheduler 130 may schedule to implement a collaborative multiple input multiple output (MIMO) operation for the serving base station 110 and one or more cooperative base stations 112, 114, and transfer an instruction for performing a collaborative multiple input multiple output (MIMO) operation to each base station 110, 112, 114.

In case of performing joint processing between multiple cell base stations, signals transmitted from multiple cell base stations to a terminal should be synchronized with one another to smoothly perform joint processing. Through such a precise synchronization, the terminal may effectively demodulate signals transmitted from multiple cell base stations.

For the synchronization between multiple cell base stations, multiple cell base stations performing joint processing may transmit data for joint processing in advance to a physical resource block (PRB) at the same location, thereby performing synchronization.

However, even when synchronizing multiple cell base stations with one another in advance and then transmitting data shared at the same physical resource block (PRB), a situation may occur where the signals of multiple cell base stations are not synchronized from one anther because a propagation delay of each cell base station is different from one another at a receiving terminal. Accordingly, it may be required a method capable of more precisely synchronizing multiple cell base stations with one another.

According to the present invention, there is proposed a method capable of precisely synchronizing multiple cell base stations performing a collaborative multiple input multiple output (MIMO) operation with one another in a wireless communication system in a multi-cell environment. In other words, according to the present invention, there is proposed a method of performing a precise synchronization between multiple cell base stations by allowing multiple cell base stations performing a collaborative multiple input multiple output (MIMO) operation such as joint processing to transmit data to the same physical resource block (PRB) while configuring a guard zone changed according to a propagation delay value of the relevant cell prior to or subsequent to the relevant physical resource block (PRB).

Figure 2:
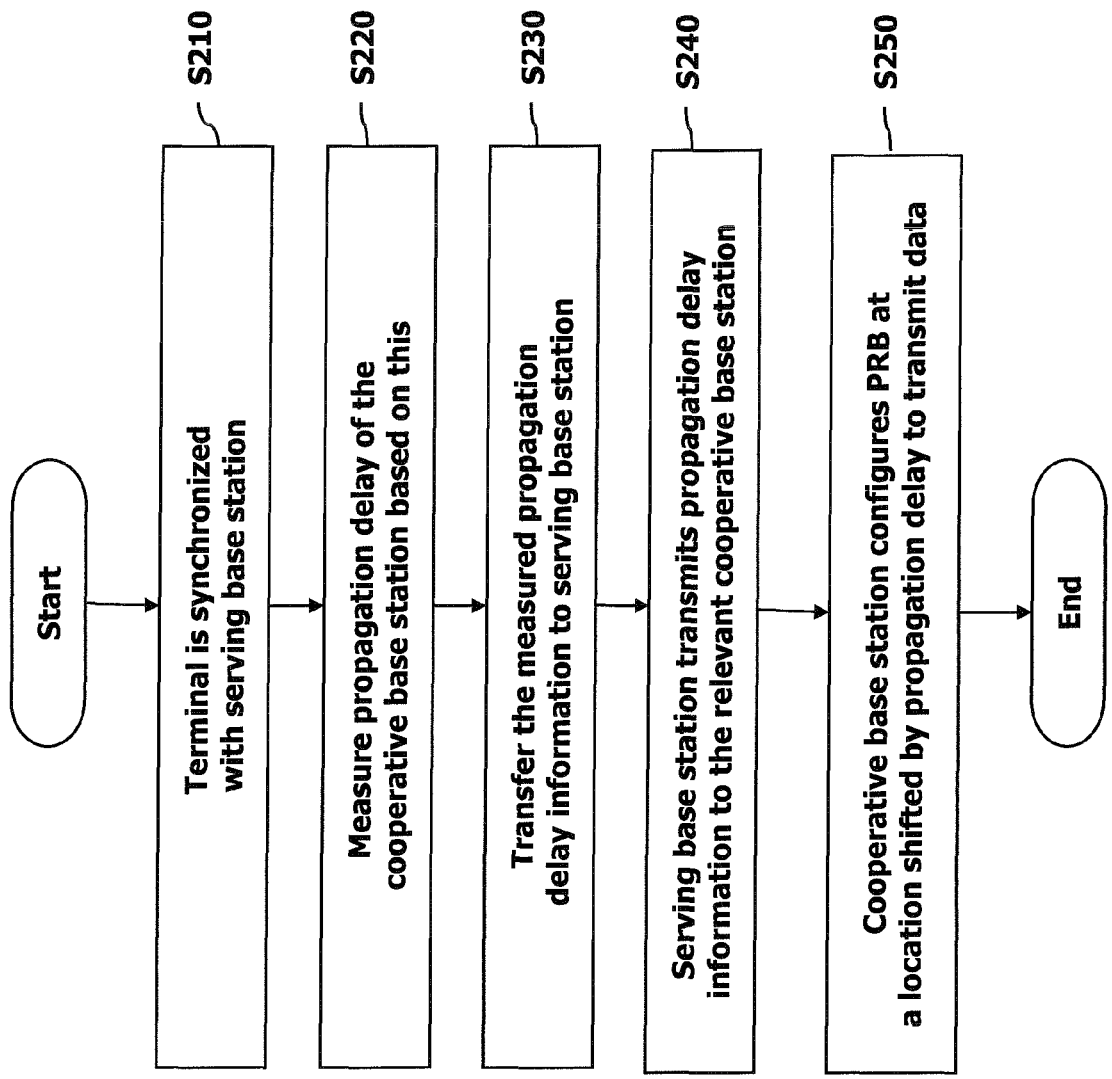
FIG. 2 is an operational flow chart for explaining an inter-cell synchronization method in a multi-cell environment according to the present invention.

Hereinafter, an inter-cell synchronization method in a multi-cell environment according to the present invention will be described in detail with reference to FIG. 2. FIG. 2 is an operational flow chart for explaining an inter-cell synchronization method in a multi-cell environment according to the present invention.

Here, the serving base station 110 and the cooperative base stations 112, 114 performing a collaborative multiple input multiple output operation transmit data using a physical resource block (PRB) having a guard zone Δt as illustrated in FIG. 3A.

Figure 3:
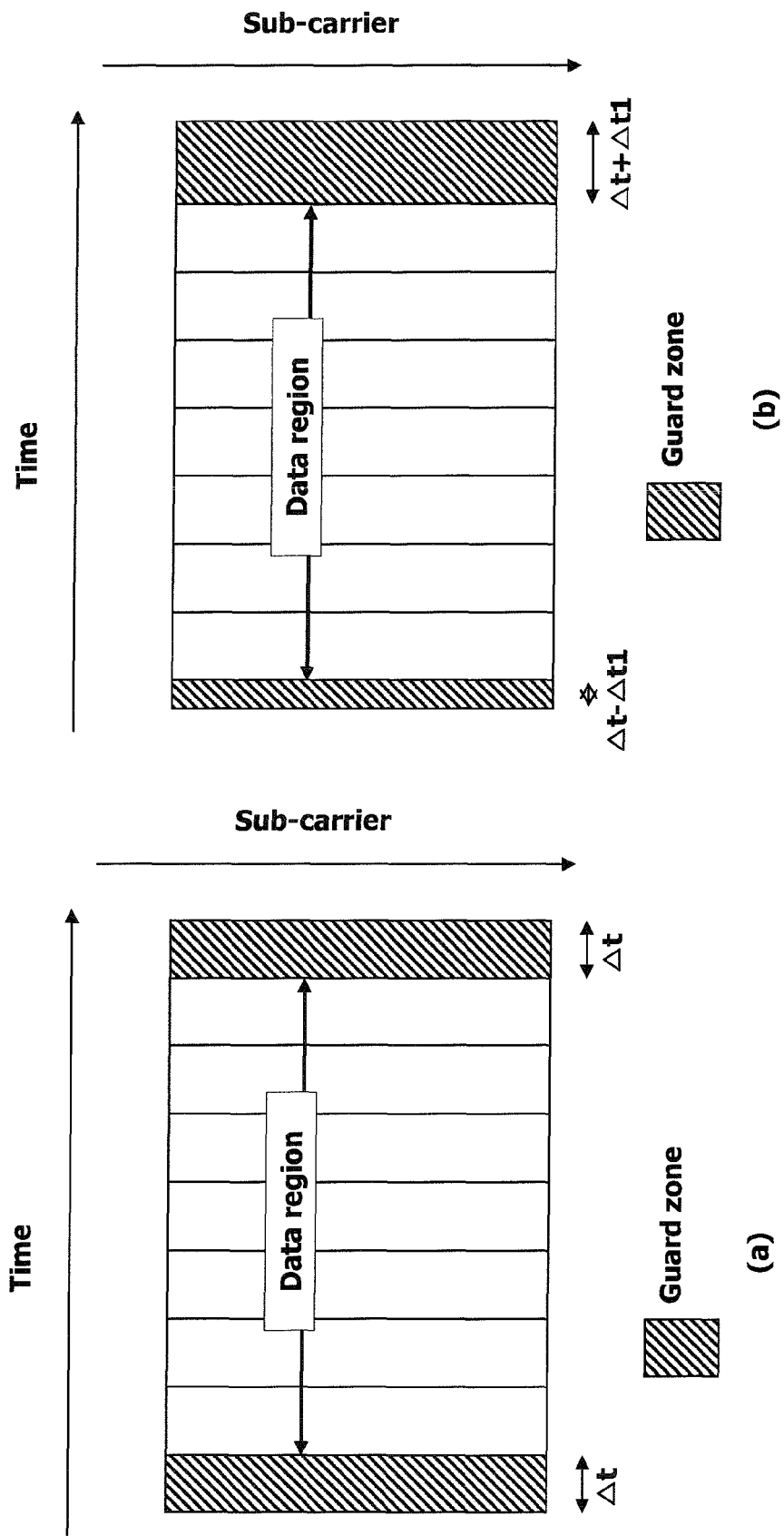
FIG. 3 is a view illustrating a configuration example of a wireless resource used in an inter-cell synchronization method in a multi-cell environment according to the present invention.

FIG. 3 is a view illustrating a configuration example of a wireless resource used in an inter-cell synchronization method in a multi-cell environment according to the present invention. At this time, a guard zone may be configured prior to or subsequent to the relevant physical resource block (PRB) as illustrated in FIG. 3.

First, the terminal 140 is synchronized with the serving base station 110 in a serving cell to which the relevant terminal belongs (S210).

Then, a propagation delay for the cooperative base stations 112, 114 of the adjacent cell performing a collaborative multiple input multiple output operation are measured on the basis of this (S220). At this time, the terminal 140 can measure a propagation delay through a reference signal (RS) or synchronization channel (SCH) provided from each base station.

The measured propagation delay information of the cooperative base stations 112, 114 is transferred to the serving base station 110 by the terminal 140 (S230). Here, a propagation delay measured by the terminal 140 may be represented by a value corresponding to the difference on the basis of the propagation delay of the serving base station 110. Furthermore, the difference value may be represented by a unit value (for example, 1 μs unit, 0.1 μs unit, etc.)

On the other hand, it may be represented by a method of dividing the difference value into a unit section and redefining a value within the section. For example, a difference value may be divided into a unit section of 5 μs, and configured with bits defining the relevant section and bits redefining a value within the section.

Furthermore, a propagation delay measured by the terminal 140 may be represented by a relative value of the cyclic prefix (CP) possessed by the serving base station 110. As an example, a propagation delay of the cooperative base stations 112, 114 may be measured and displayed with a ¼ unit, ⅛ unit, 1/16 or 1/32 unit of the cyclic prefix (CP) possessed by the serving base station 110 and fed back to the serving base station 110. At this time, a propagation delay measured by a relative value of the cyclic prefix (CP) may be displayed and fed back with a different number of bits according to a unit and range of the relative value.

Then, the serving base station 110 transfers the transferred propagation delay to the relevant cooperative base stations 112, 114, respectively (S240). The cooperative base stations 112, 114 perform an inter-cell synchronization operation based on the transferred propagation delay information.

Then, each of the cooperative base stations 112, 114 configures a physical resource block (PRB) at a location (i.e., Δt-Δt1) shifted by a measured and fed-back propagation delay (for example, Δt1) of itself as illustrated in FIG. 3B to transfer data (S250).

In this manner, according to the present invention, a guard zone of the relevant cooperative base station is changed based on a propagation delay of the cooperative base station measured by the terminal, thereby preventing signal timings from going wrong due to a propagation delay possessed by the relevant cooperative base station, and allowing multiple cell base stations to be synchronized with one another.

Figure 4:
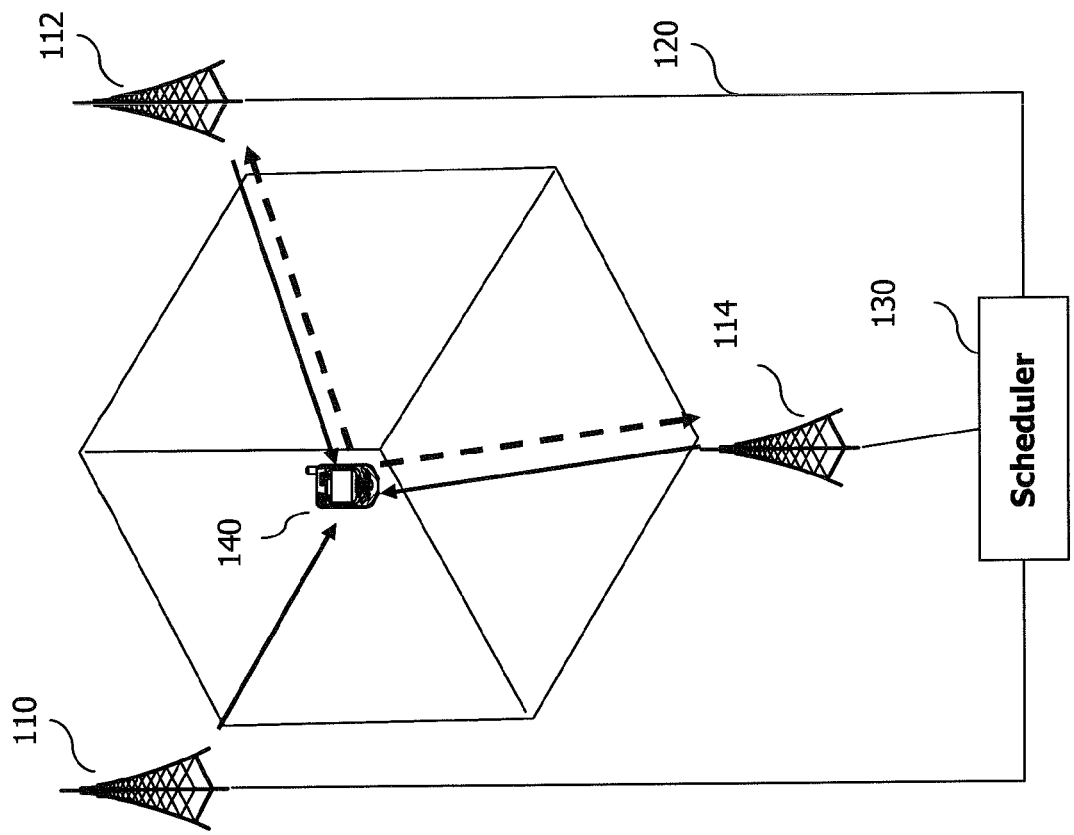
FIG. 4 is a view illustrating another configuration example for an inter-cell synchronization method in a multi-cell environment according to the present invention.

As described above, all the propagation delay information of the cooperative base station measured by the terminal is transferred to a serving base station, but such a configuration may not be necessarily required. In other words, as illustrated in FIG. 4, it may be also possible to configure such that the terminal directly transfers the propagation delay information of the cooperative base station to relevant cooperative base stations, respectively. FIG. 4 is a view illustrating another configuration example for an inter-cell synchronization method in a multi-cell environment according to the present invention.

Furthermore, according to the foregoing embodiment, synchronization may be carried out in such a manner that propagation delays are fed back for all cooperative base stations performing a collaborative multiple input multiple output (MIMO) operation and a transmission location of data is adjusted according to the transferred propagation delays, but the present invention will not be necessarily limited to this.

In other words, a propagation delay may be fed back only for a specific cooperative base station instead of being fed back for all cooperative base stations performing a collaborative multiple input multiple output (MIMO) operation. For example, the relevant propagation delay may be fed back to a serving cell only when a propagation delay measured by the terminal is larger than a cyclic prefix (CP) of the serving cell. In this case, the terminal may be allowed to feed back a propagation delay only for a cooperative base station satisfying a predetermined standard, thereby reducing an upload data transmission amount for performing synchronization.

On the other hand, as described above, a guard zone may be configured and used in a time zone to precisely perform synchronization between multiple cell base stations. However, according to the present invention, a guard band may be configured and used together with a guard zone at both sides of a wireless frequency region used in a collaborative multiple input multiple output (MIMO) method.

Figure 5:
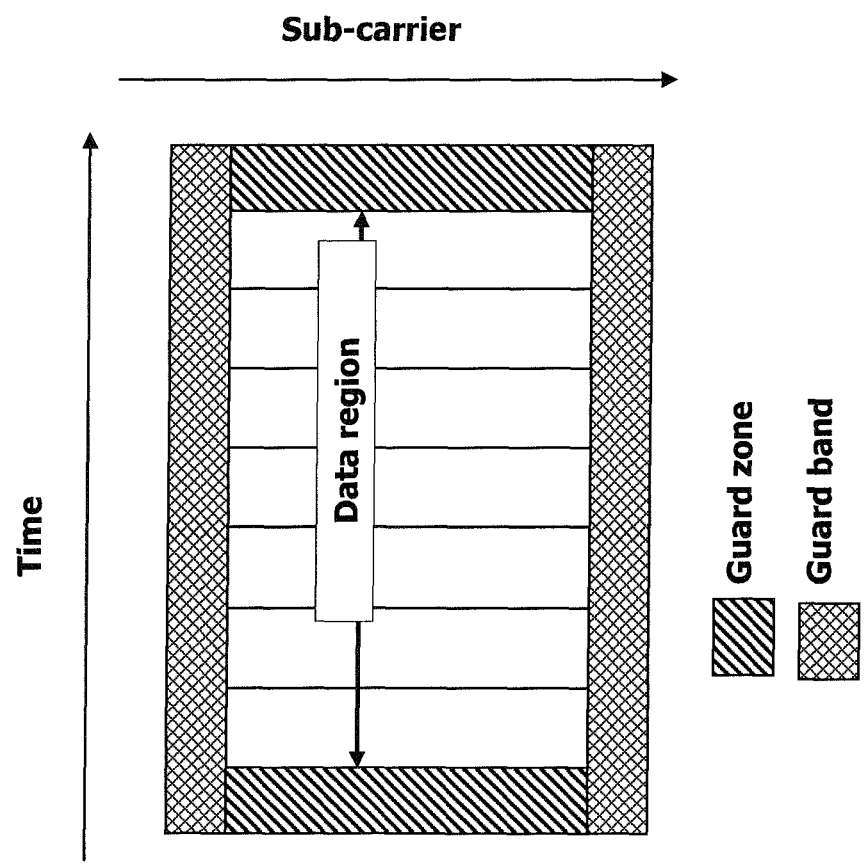
FIG. 5 is a view illustrating an example in which a guard band on a frequency zone is configured together with a guard zone on a time zone in a wireless resource used in a collaborative multiple input multiple output method.

An example in which a guard band on a frequency zone is configured together with a guard zone on a time zone in a wireless resource used in a collaborative multiple input multiple output (MIMO) method is illustrated in FIG. 5. FIG. 5 is a view illustrating an example in which a guard band on a frequency zone is configured together with a guard zone on a time zone in a wireless resource used in a collaborative multiple input multiple output (MIMO) method.

In this manner, a guard band may be configured in a wireless frequency region used in a collaborative multiple input multiple output method to reduce inter-subcarrier interference in an Orthogonal Frequency Division Modulation (OFDM) symbol. Through this, it may be possible to reduce interference between a wireless resource region for unicast and a wireless resource region for the collaborative multiple input multiple output method.

Figure 6:
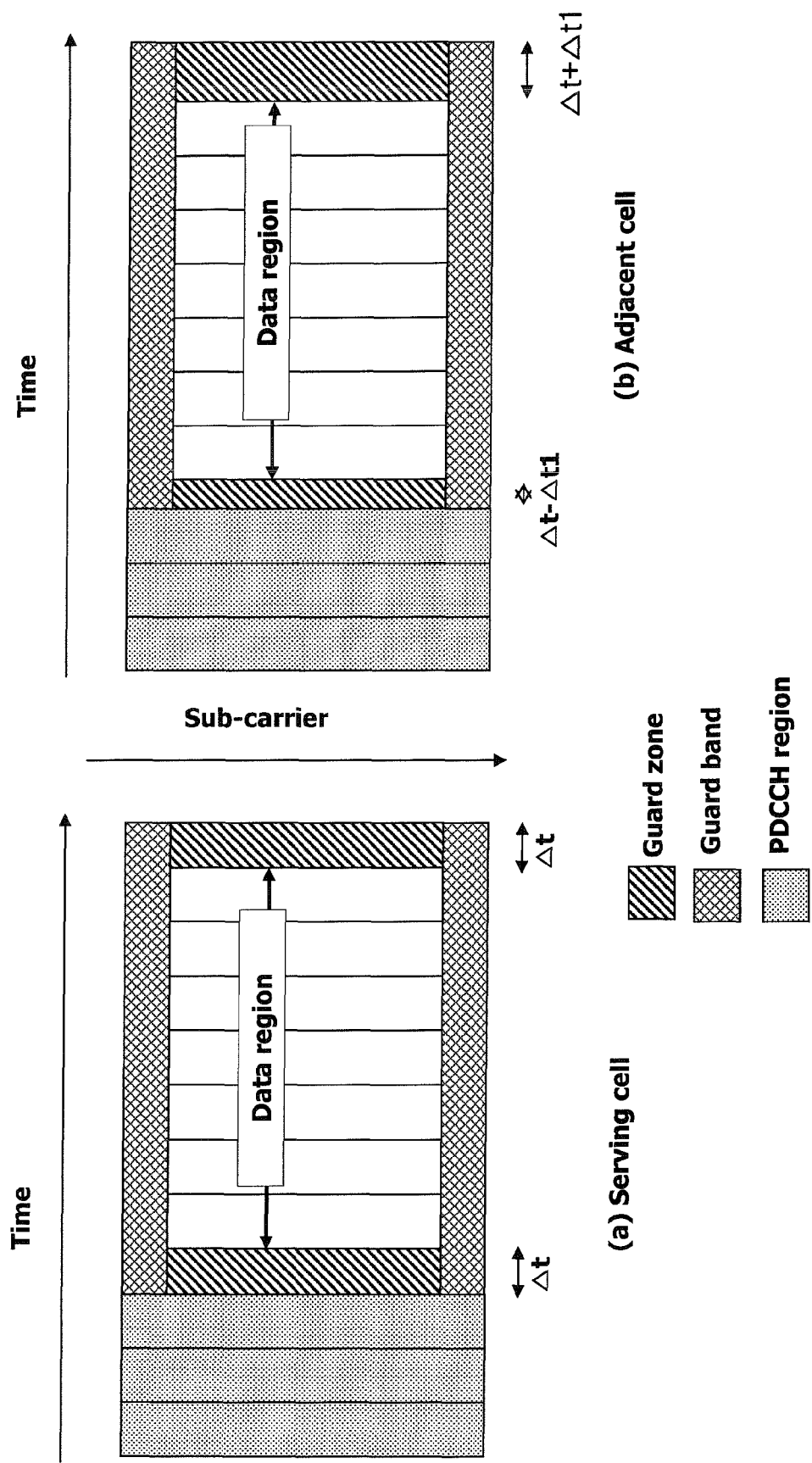
FIG. 6 is a view illustrating an example in which a guard band on a frequency zone is configured together with a guard zone on a time zone according to the present invention in a wireless resource used in a Long Term Evolution (LTE) system.

Hereinafter, according to an embodiment of the present invention, a detailed scheme of the present invention applied to a Long Term Evolution (LTE) system will be described with reference to FIG. 6. FIG. 6 is a view illustrating an example in which a guard band on a frequency zone is configured together with a guard zone on a time zone according to the present invention in a wireless resource used in a Long Term Evolution (LTE) system.

In an LTE system, downlink transmission may be divided into a Physical Downlink Control Channel (PDCCH) region configured with 1-3 symbols and a Physical Downlink Shared Channel (PDSCH) region configured with 11-13 symbols. The present invention may be applicable to a PDSCH region excluding a PDCCH region (1-3 symbols) as illustrated in FIG. 6 to apply it to such an LTE system. In other words, a guard zone according to the present invention may be applicable on the basis of a PDSCH region excluding a PDCCH region.

More specifically, a PDCCH region may be assigned to 1 to 3 symbols. Accordingly, multiple cells performing collaborative multiple input multiple output (MIMO) may perform downlink transmission using different PDCCH regions.

In other words, when multiple cells transmit downlink transmission using the same PDCCH region, the present invention may be applied to each cell from a timing at which the PDCCH region ends. However, when performing downlink transmission using different PDCCH regions, the same standard for applying the present invention to multiple cells may be required.

As an example, the present invention may be applied thereto by assuming 3 symbols which is a maximum size irrespective of the PDCCH region of multiple cells, and regarding the fourth symbol and subsequent symbols as a PDSCH region. Furthermore, the present invention may be applied thereto by determining a PDCCH region based on a cell using the largest number of symbols in the PDCCH region of multiple cells performing collaborative multiple input multiple output (MIMO), and configuring the subsequent portions as a PDSCH region. At this time, in case of a cell using a region with a smaller number of symbols than that of the reference as PDCCH, the remaining portions may not be used, or may be used for other data.

On the other hand, on the basis of a PDCCH region of the serving cell, the present invention may be applied thereto by forcibly adjusting and configuring a PDCCH region of the adjacent cells performing collaborative multiple input multiple output (MIMO). Otherwise, a predetermined PDCCH region (for example, PDCCH region=1 when performing joint processing) may be determined for multiple cells performing joint processing, and the present invention may be applied on the basis of this.

Next, various methods will be described that can be used to transmit the propagation delay information of the cooperative base station performing a collaborative multiple input multiple output (MIMO) operation from a terminal to a serving base station in the present invention.

As described above, in order to perform an inter-cell synchronization method in a multi-cell environment of the present invention, propagation delay information as well as the existing information such as a precoding matrix index (PMI) and channel quality indicator (CQI) of the adjacent cell performing a collaborative multiple input multiple output (MIMO) operation reporting information should be transmitted to the serving base station.

As a result, according to the present invention, a Physical Uplink Control Channel (PUCCH) format different from the existing one may be used to transmit propagation delay information. For example, the terminal that has measured a propagation delay may sequentially map propagation delay values of the cooperative base stations to the channel quality bits $a_0$, $a_1, a_2, \ldots, a_{A-1}$, starting from $a_0$.

Furthermore, for the mapping order of propagation delays, the cell base station may transfer cell ID information performing a collaborative multiple input multiple output (MIMO) operation in advance, and transmit the corresponding propagation delay information in the order of interference levels. On the other hand, the order of cell IDs may be predefined to transmit propagation delay information in the predefined order of cell IDs. In addition, propagation delay information may be transmitted in the order of the smallest size of the measured adjacent cell or may be transmitted in the order of the largest size thereof.

On the other hand, when the terminal gets a feedback of the propagation delay in such a specified order, a differential encoding method may be used. In other words, on the basis of a propagation delay transmitted for the first time, a propagation delay transmitted for the next time may be encoded only for a changed amount from the first propagation delay. In case of using the foregoing method, it may be possible to reduce the transmitted number of bits.

Furthermore, for the timing of transmitting a propagation delay of the cooperative base station performing a collaborative multiple input multiple output (MIMO) operation in such a manner, it may be also possible to transmit it using a timing of transmitting a precoding matrix index (PMI) and a wideband channel quality indicator (CQI) for unicast.

According to the present invention, information that can be fed back from the terminal may include a PMI set, a cell ID, a CQI set, and the like as well as a propagation delay. In this manner, when information fed back from the terminal increases, the present invention may increase the number of transmissions for feedback may be increased, or use an extended format including further information.

For example, it may be configured such that only a predetermined number of propagation delays for cooperative base stations are transmitted at the first transmission timing, and propagation delays for the remaining cooperative base stations are transmitted at the next transmission timing. Furthermore, in case where other information should be in addition to a propagation delay, the propagation delay may be transmitted at the first transmission timing, a PMI set is transmitted at the next transmission timing, and then a cell ID, a CQI set and the like may be transmitted at the next transmission timing.

On the other hand, when there is a lot of feedback information on a cooperative base station in the present invention, feedback information may be transmitted through a Physical Uplink Shared Channel (PUSCH). At this time, the Physical Uplink Shared Channel (PUSCH) for transmitting feedback information may be used with a method of being periodically assigned or a method of being non-periodically assigned.

In case of the method of being periodically assigned, a predetermined period may be notified to the terminal using a flag such as a CQI report flag in the early stage of initiating a collaborative multiple input multiple output method. On the other hand, in case of the method of being non-periodically assigned, the base station may assign a Physical Uplink Shared Channel (PUSCH) using a flag at a timing when a feedback of the relevant terminal is needed. At this time, the information being fed back may be multiplexed with data information, or only the relevant feedback information may be transmitted.

The feedback information being transmitted from the terminal through a Physical Uplink Shared Channel (PUSCH) may include a PMI set, a cell ID, a CQI set, and the like as well as propagation delay information on the cooperative base station measured by the terminal.

In other words, a cell base station may transfer cell ID information performing a collaborative multiple input multiple output (MIMO) operation in advance, and transmit the corresponding propagation delay information in the order of interference levels, and additionally, the order of cell IDs may be predefined to transmit propagation delay information in the predefined order of cell IDs. Moreover, propagation delay information may be transmitted in the order of the smallest size of the measured adjacent cell or may be transmitted in the order of the largest size thereof, and fed back using a differential encoding method.

As described above, according to an inter-cell synchronization method in a multi-cell environment according to the present invention, multiple cell base stations performing a collaborative MIMO operation, particularly multiple cell base stations performing joint processing, can be precisely synchronized with one another under a multi-cell environment, thereby enhancing the communication performance of a terminal located at an edge of the cell.

Various embodiments have been disclosed herein to describe an original thought associated with several aspects of the present invention. However, one or more practical features in a specific embodiment may be applicable to one or more other embodiments. Some elements or steps described in each embodiment and its associated drawings may be modified and additional elements and/or steps may be deleted, moved, or included therein.

Various thoughts and properties described herein may be implemented in various forms within the features of the present invention, and it should be understood by those skilled in the art that the foregoing embodiments will not be limited by the forgoing detailed description, and should be broadly construed within the scope of the technical spirit defined by the appended claims unless otherwise particularly specified. All changes and modifications that fall within the scope or equivalents thereof are therefore intended to be embraced by the appended claims.

The invention claimed is:

1. An inter-cell synchronization method in a multi-cell environment for synchronizing multiple cells performing a collaborative multiple input multiple output (MIMO) operation, the method comprising:
    measuring, by a user equipment, a propagation delay for a cooperative base station;
    transferring, by the user equipment, the measured propagation delay to the cooperative base station via a serving base station; and
    receiving, by the user equipment, data for collaborative multiple input multiple output (MIMO) from the cooperative base station through a physical resource block (PRB) on a time-frequency plane,
    wherein a guard zone is located prior to and subsequent to the PRB, and
    wherein a length of the guard zone has been adjusted on a time axis of the time-frequency plane by the cooperative base station based on the propagation delay.

2. The method of claim 1, wherein a guard band on a frequency axis of the time-frequency plane is configured in the PRB used in the collaborative multiple input multiple output.

3. The method of claim 1, wherein the measurement of the propagation delay for the cooperative base station is carried out using at least any one of a reference signal (RS) or synchronization channel (SCH) of each base station.

4. The method of claim 1, wherein a result of the measurement of the propagation delay for the cooperative base station is represented by a difference value from a propagation delay of the serving base station.

5. The method of claim 1, wherein a result of the measurement of the propagation delay for the cooperative base station is represented by a relative value of the cyclic prefix (CP) possessed by the serving base station.

6. The method of claim 1, wherein the measured propagation delay is transferred to a serving base station only when the propagation delay is longer than a predetermined value.

7. The method of claim 1, wherein the measured propagation delay is transferred to a serving base station through a Physical Uplink Control Channel (PUCCH) or Physical Uplink Shared Channel (PUSCH).

8. The method of claim 1, wherein the guard zone is applied to a Physical Uplink Shared Channel (PUSCH) region excluding a Physical Uplink Control Channel (PUCCH) region.

9. A user equipment for an inter-cell synchronization in a multi-cell environment for synchronizing multiple cells performing a collaborative multiple input multiple output (MIMO) operation, the user equipment comprising:
    a propagation delay measurement unit configured to measure a propagation delay for a cooperative base station;
    a transmitter configured to transfer the measured propagation delay to the cooperative base station via a serving base station; and
    a receiver configured to receive data for collaborative multiple input multiple output (MIMO) from the cooperative base station through a physical resource block (PRB) on a time-frequency plane,
    wherein a guard zone is located prior to and subsequent to the PRB, and
    wherein a length of the guard zone has been adjusted on a time axis of the time-frequency plane by the cooperative base station based on the propagation delay.

10. The user equipment of claim 9, wherein the propagation delay measurement unit measures the propagation delay for the cooperative base station using at least any one of a reference signal (RS) or synchronization channel (SCH) of each base station.

11. The user equipment of claim 9, wherein a result of the measurement of the propagation delay for the cooperative base station in the propagation delay measurement unit is represented by a difference value from a propagation delay of the serving base station.

12. The user equipment of claim 9, wherein a result of the measurement of the propagation delay for the cooperative base station in the propagation delay measurement unit is represented by a relative value of the cyclic prefix (CP) possessed by the serving base station.

13. The user equipment of claim 9, wherein the transmitter transfers the measured propagation delay to the serving base station only when the propagation delay is longer than a predetermined length.

14. The user equipment of claim 9, wherein the transmitter transfers the propagation delay to the serving base station through a Physical Uplink Control Channel (PUCCH) or Physical Uplink Shared Channel (PUSCH).

* * * * *